Oct. 15, 1929.　　M. B. RATCLIFFE　　1,731,320
AUTOMATIC PIPE COUPLING
Filed Feb. 8, 1928　　3 Sheets-Sheet 1
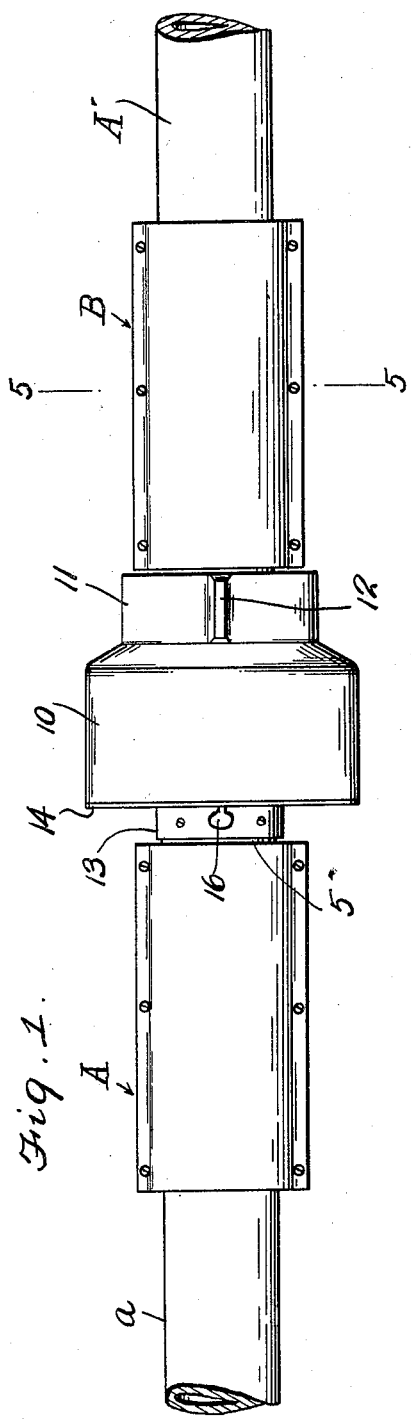
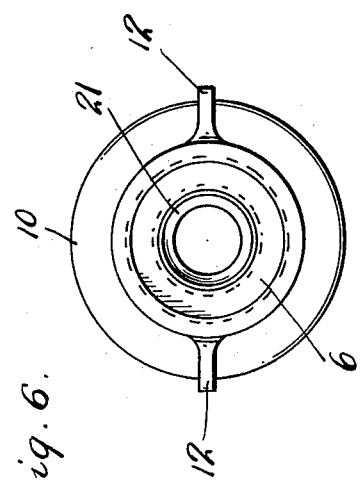
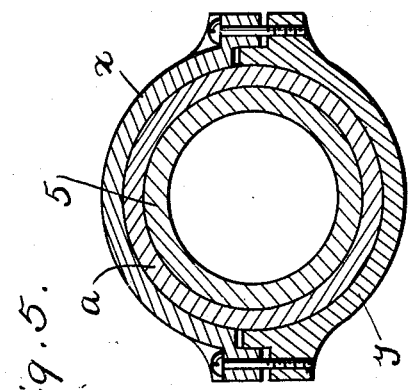
Inventor
*Myrtle B. Ratcliffe*
By *Clarence A. O'Brien*
Attorney

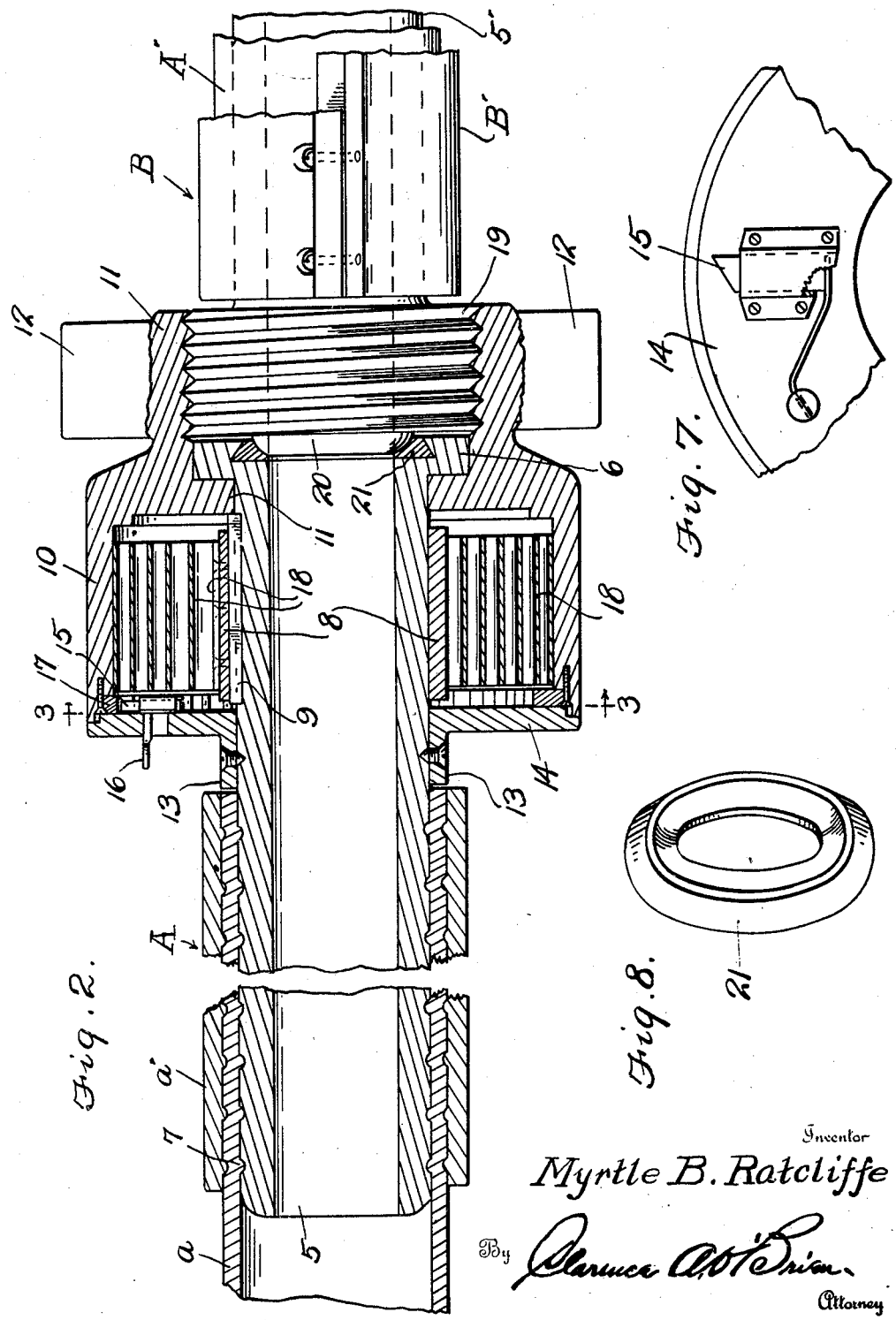

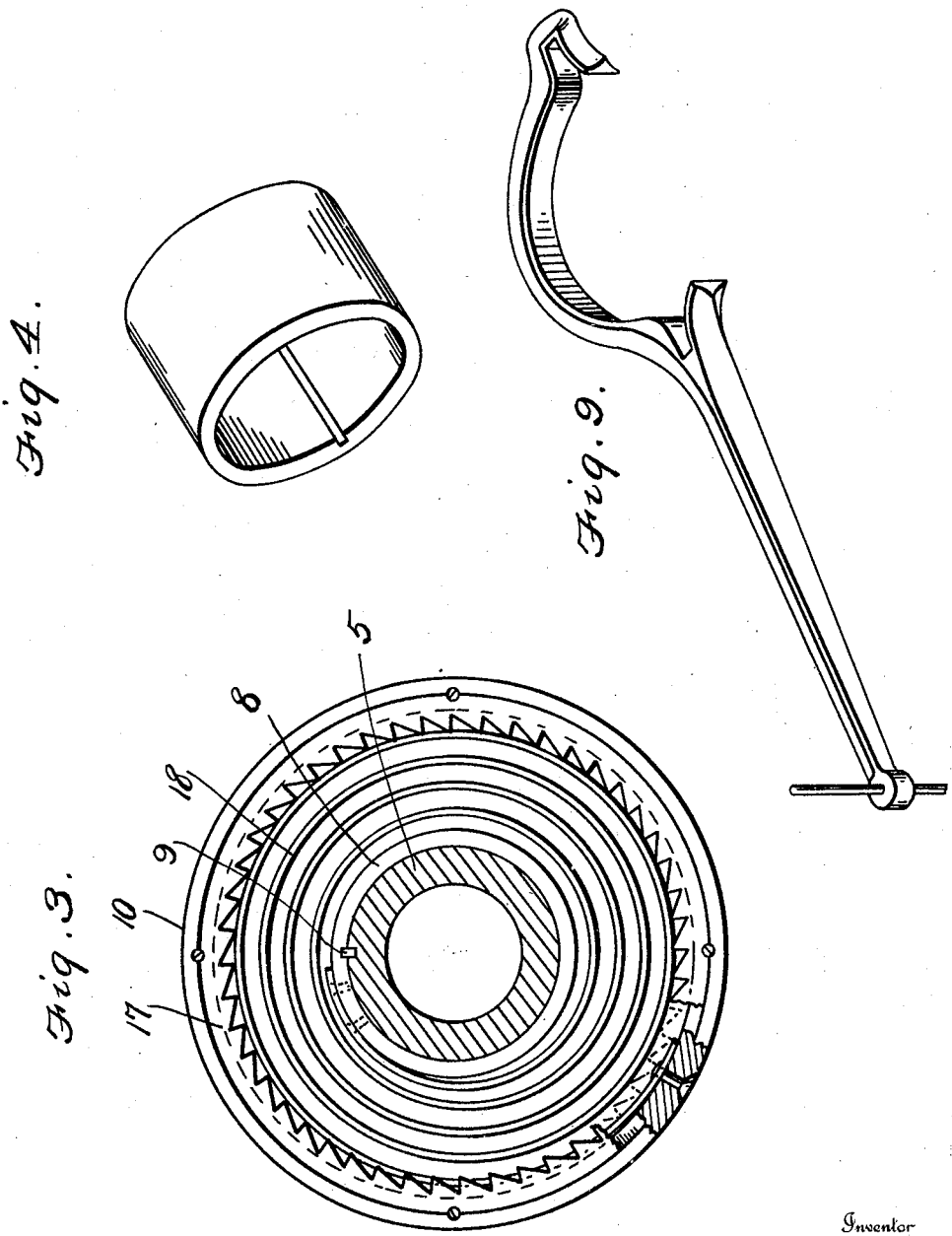

Patented Oct. 15, 1929

1,731,320

UNITED STATES PATENT OFFICE

MYRTLE B. RATCLIFFE, OF WINSTON-SALEM, NORTH CAROLINA

AUTOMATIC PIPE COUPLING

Application filed February 8, 1928. Serial No. 252,790.

This invention relates to new and useful improvements in pipe couplings and aims to provide an automatic coupling wherein the adjacent end of a pair of flexible pipe or hose sections may be rapidly interconnected in an automatic manner.

Especially in the interconnection of fire hose sections is it necessary that the coupling of the sections be performed in a rapid manner so that the water may be directed to the fire as quickly as possible. However, in the use of the common coupling now employed it frequently happens that the fireman cannot readily join the ends of the various hose sections which of course will give the fire a good start and result in great damage that would not otherwise happen had means been provided whereby the sections of the hose could have been rapidly interconnected.

Generally the invention consists of a pair of pipe sections to be associated with adjacent ends of a pair of hose sections, the outer end of one of said sections being threaded, while the outer end of the complemental section is also threaded for receiving the threaded end of the other section, the threaded end of the second mentioned section being rotatably mounted with respect to its pipe section and being normally spring wound thereon and retained in the wound condition by a suitable latch unit which after the sections are brought into contact may be released so that the rotary unit will come under the action of the spring to automatically feed itself into engagement with the end of the other coupling section.

An important object of this invention is to provide a coupling of this character that is, generally speaking, of simple construction, inexpensive of manufacture and that will not readily become out of order.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a plan view of my improved coupling.

Figure 2 is a detail longitudinal section on an enlarged scale.

Figure 3 is a transverse sectional view through one unit of the coupling taken substantially upon the line 3—3 of Figure 2.

Figure 4 is a perspective of a collar member that forms an essential part of the device.

Figure 5 is a slightly enlarged transverse cross section taken substantially upon the line 5—5 of Figure 1.

Figure 6 is an end elevation of the primary unit of the coupling.

Figure 7 is a fragmentary inside elevation of the spring drum closure plate equipped with a normally operative spring ratchet dog.

Figure 8 is a perspective of a lead gasket carried by one of the units of the coupling within which an annular rib formed upon the adjacent end of the other unit is adapted to rest for forming a water proof joint, and Figure 9 is a perspective of a particular character of tool that may be used in the releasing of the coupling.

Now having particular reference to the drawing my novel coupling consists of a primary and secondary coupling unit designated generally A and B, respectively. The primary unit A consists of a rigid pipe section 5, the inner end of which is formed exteriorly with a circular flange 6. This pipe section at its outer end being formed with circumferential channels 7, while adapted to be arranged thereover is one end of an ordinary flexible pipe or hose section a, after which the same is secured to the end of the pipe section 5 of the unit A by a suitable pipe clamp a' preferably in the form of a pair of half sections x and y formed at their opposite longitudinal edges with ribs whereby to facilitate the securing of the sections by screws or other suitable means threaded through openings in the ribs as disclosed in Figure 5.

Arranged upon the pipe section 5 of the primary coupling unit A and in spaced relation with said annular flange 6 is a collar 8 keyed to the pipe section as at 9.

Rotatably arranged upon the forward end of said pipe section 5 is a spring drum 10 open at its rear end and formed internally with a flange 11 for engagement directly in back of the flange 6 of said pipe section, this drum 10 being formed at its forward end with a longitudinally extending internally threaded collar 11 that projects beyond the flange 6 as clearly disclosed in Figure 2. Furthermore, this collar 11 is formed exteriorly with opposed radiating ribs 12—12 whereby to permit a suitable tool, preferably of the character disclosed in Figure 9 to be associated therewith to permit the drum 10 to be rotated in a direction to release the coupling.

Secured to the pipe section 5 directly in back of the drum 10 is a collar 13 formed at its forward end with a closure plate 14 for the adjacent open end of said drum 10, while arranged upon the inner face of this plate 14 adjacent its periphery is a spring pressed ratchet dog 15 operable to released position by a pin 16 extending horizontally through a slot in the plate 14.

This dog 15 is complemental to a ratchet ring 17 secured within the drum 10 directly in back of the closure plate 14, while arranged within said drum is a relatively wide clock spring 18, one end of which is anchored to the drum 10 while the opposite end thereof is anchored to the collar 8 keyed to the pipe section 5. Obviously, the turning of the drum 10 toward the left will cause the winding of the spring 18 whereas the drum will be locked in its wound condition through the instrumentality of the complemental dog 15 and ratchet ring 17. However, upon releasing the dog 15 the said drum 10 will rapidly rotate in a clockwise direction for bringing about a result presently to be described.

The secondary coupling section B also includes a pipe section 5′ over which is arranged one end of a hose section A′ secured thereto through the medium of a clamp B′ of the construction previously described. The inner end of this pipe section 5′ is of enlarged diameter and is externally threaded as at 19 adapted for threaded engagement within the threaded collar 11 of said spring drum 10. At the extreme inner end of the pipe section 5′ there is formed a circular rib 20 for seating engagement within a lead gasket 21 which is arranged within a dovetail channel in the adjacent end of the pipe section 5 of the primary coupling unit A.

Obviously the drum 10 is normally in wound condition so that as soon as the enlarged threaded end 19 of the coupling unit B has been brought into engagement with the collar 11 of the unit A a releasing of the dog 15 will result in the automatic and rapid turning of the collar 11 upon the threaded end of the pipe section of said coupling unit B.

In view of the foregoing description when considered in conjunction with the accompanying drawings it will be apparent that I have provided a highly novel, simple, and extremely useful and efficient coupling for hose sections and the like as is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a pipe coupling of the class described, a stationary coupling member, a rotary coupling member, complemental locking structure between the members when one is rotated with respect to the other, and a normally wound and locked spring motor associated with the rotary coupling member whereby to cause the automatic rotation of the member when the spring motor is released.

2. In a pipe coupling of the class described, a stationary coupling member, a rotary coupling member, complemental locking structure between the members when one is rotated with respect to the other, normally wound spring means associated with the rotary member, means for locking said spring means in wound condition, and means whereby said spring means may be released for causing the rapid rotation of the said member bringing about the locking of said complemental locking structure.

In testimony whereof I affix my signature.

MYRTLE B. RATCLIFFE.